US 8,472,669 B2

United States Patent
Sharma (10) Patent No.: US 8,472,669 B2
(45) Date of Patent: Jun. 25, 2013

(54) OBJECT LOCALIZATION USING TRACKED OBJECT TRAJECTORIES

(75) Inventor: Vinay Sharma, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 124 days.

(21) Appl. No.: 13/038,176

(22) Filed: Mar. 1, 2011

(65) Prior Publication Data

US 2011/0222727 A1 Sep. 15, 2011

Related U.S. Application Data

(60) Provisional application No. 61/312,296, filed on Mar. 10, 2010.

(51) Int. Cl.
*G06K 9/00* (2006.01)
*H04N 5/225* (2006.01)

(52) U.S. Cl.
USPC .......................................... 382/103; 348/169

(58) Field of Classification Search
USPC .................. 382/103, 107, 236; 348/169–172, 348/208.1, 208.4, 208.14, 208.16, 352; 701/32.4, 412, 468, 470, 471; 342/357.39, 342/357.72; 386/227
See application file for complete search history.

(56) References Cited

U.S. PATENT DOCUMENTS 6,587,574 B1 * 7/2003 Jeannin ........................ 382/107
6,665,423 B1 * 12/2003 Mehrotra et al. ............. 382/107

OTHER PUBLICATIONS

Vinay Sharma, "Blob Representation in Video Processing", U.S. Appl. No. 12/966,798, filed Dec. 13, 2010, pp. 1-28.
Vinay Sharma, "Method and Apparatus for Tracking Objects Across Images", U.S. Appl. No. 12/910,494, filed Oct. 22, 2010, pp. 1-8.

* cited by examiner

*Primary Examiner* — Abolfazl Tabatabai
(74) *Attorney, Agent, or Firm* — Mirna Abyad; W. James Brady; Frederick J. Telecky, Jr.

(57) ABSTRACT

A method of processing a video sequence is provided that includes tracking a first object and a second object for a specified number of frames, determining similarity between a trajectory of the first object and a trajectory of the second object over the specified number of frames, and merging the first object and the second object into a single object when the trajectory of the first object and the trajectory of the second object are sufficiently similar, whereby an accurate location and size for the single object is obtained.

20 Claims, 6 Drawing Sheets

OBJECT LOCALIZATION USING TRACKED OBJECT TRAJECTORIES

CROSS-REFERENCE TO RELATED APPLICATIONS

This application claims benefit of U.S. Provisional Patent Application Ser. No. 61/312,296, filed Mar. 10, 2010, which is incorporated by reference herein in its entirety.

BACKGROUND OF THE INVENTION

Many vision-based applications rely on obtaining an accurate estimate of the location and size (scale or extent), i.e., localization, of the objects in a scene. However, detecting objects and estimating their sizes in the 2D plane is difficult, and is a subject of on-going research. Many current object detection techniques may err by detecting parts of an object as multiple separate objects instead of generating a single output for the whole object. This object fragmentation can cause inaccuracies in any additional processing that relies on the output of the object detection technique. For example, an application may be counting the number of people in a scene. If the object detection technique detects a person as multiple objects rather than a single object, the count will be inaccurate.

In an effort to determine a more accurate 2D object size to reduce the chances of object fragmentation, some object detection techniques perform complex, computationally intensive processing such as processing an image at multiple scales using an image pyramid, and/or using clustering algorithms to group similar features together, etc. These techniques may be effective in some cases, but come at a high cost in terms of processing time and computation and memory bandwidth. As a result, object detection may be a bottleneck in many applications. Accordingly, improvements in object localization are desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. In addition, for convenience in describing embodiments of the invention, the term frame may be used to refer to the portion of a video sequence being encoded or decoded. One of ordinary skill in the art will understand embodiments of the invention that operate on subsets of frames such as, for example, a slice, a field, a video object plane, etc.

Embodiments of the invention provide for reducing object fragmentation and improving object localization by using object tracking to complement object detection. In general, in embodiments of the invention, object tracking is used to track the objects detected by the object detection over time. The trajectories of the tracked objects are examined and spatio-temporal grouping of these trajectories is performed to determine similarity between the trajectories. Based on the determined similarities, individual objects may be merged, resulting in a better estimate of object location and size. Embodiments of the invention may be particularly applicable in applications where there is access to video data and there is no strict requirement for instantaneous (close to zero second delay) object detection.

Figure 1:
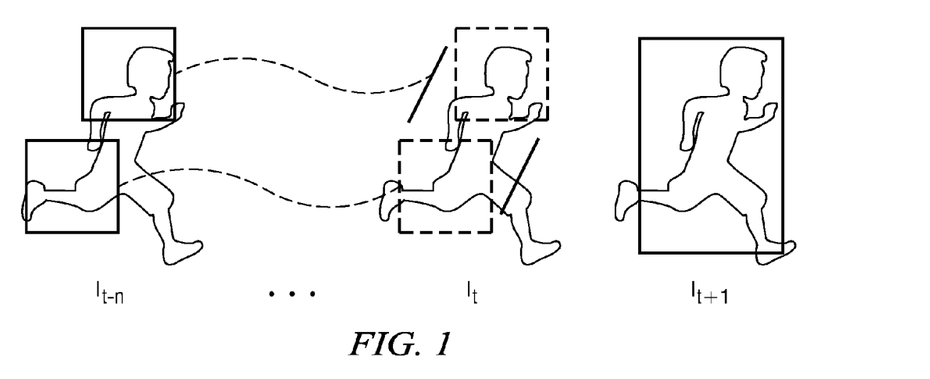
FIG. 1 shows an example of object fragmentation.

FIG. 1 is an illustration of the application of an embodiment of the invention. At time t-n, object detection identifies the running child as two separate objects. Over the next N frames, the two objects are tracked. At time t, the trajectories of the two objects over the n frames are compared, and the two objects are found to have parallel, i.e., similar, trajectories. The two objects are moving in a coherent manner, so the assumption is made that the two objects are a single object, and the objects are merged. At time t+1, a single object is then detected and tracked. Note that motion in the tracked objects is not required, just N successive frames of video.

At the core of embodiments of the invention is an efficient technique for identifying similar object trajectories over time. The technique to find similar trajectories relies on estimating the parallelism between pairs of trajectories. Consider two objects, A and B, that are tracked over time, i.e., N frames. At the Nth frame, the instantaneous distance between A and B is compared against a threshold. If the pair passes this proximity test, the magnitude and direction of their velocity vectors is compared. If these too are similar enough, a test for parallelism of the trajectories is performed. This test basically compared the angle of convergence (or divergence) of the trajectories against an adaptive convergence (divergence) threshold computed based on a maximum convergence (divergence) angle. If this test shows that the two trajectories are converging (diverging) slowly enough, i.e., are sufficiently similar, the two objects are merged into one.

Figure 2:
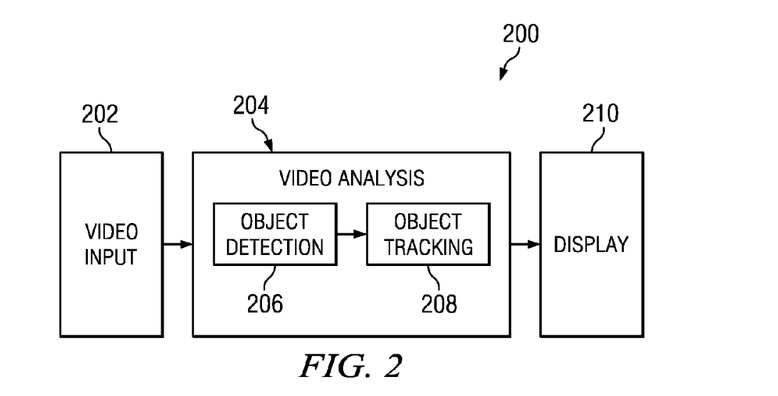
FIG. 2 shows a block diagram of a computer vision system in accordance with one or more embodiments of the invention.

FIG. 2 shows a block diagram of a computer vision system (200) in accordance with one or more embodiments of the invention. The system (200) includes a video input component (202), a video analysis component (204), a storage component (212), and a display (210). The components in the embedded vision system may be implemented in any suitable combination of software, firmware, and hardware, such as, for example, one or more digital signal processors (DSPs), microprocessors, discrete logic, application specific integrated circuits (ASICs), etc.

The video input component (202) provides a video sequence to be analyzed by the video analysis component (204). The video input component (202) may be, for example, a digital video camera, a webcam, a medical imaging device, a DVR, a DVD, a video archive, or a video feed from a video content provider. In some embodiments of the invention, the video input component (202) may generate computer graphics as the video sequence, or a combination of live video and computer-generated video. The area visible to the video input component (204) may be referred to as the "scene" and the video sequence may be a series of frames recording the scene over time. The connection between the video input component (202) and the video analysis component (204) may be a direct or indirect connection or a network connection via, for example, a local area network (LAN), a wide area network (WAN) such as the Internet, a cellular network, any other similar type of network and/or any combination thereof through a network interface (not shown).

The video analysis component (204) receives frames of the video sequence from the video input component (202) and analyzes the received frames using various computer vision techniques to extract information relevant to the particular application of the computer vision system (200), e.g., video surveillance, people counting, etc. For example, the video analysis component (204) may be configured to analyze the frame contents to identify and classify objects in the video sequence, derive information regarding the actions and interactions of the objects, e.g., position, classification, size, direction, orientation, velocity, acceleration, and other characteristics, and provide this information for display and/or further processing.

The video analysis component (204) includes an object detection component (206) and an object tracking component (208). The object detection component (206) includes functionality to identify foreground objects in each frame of the video sequence, and to provide information about the objects to the object tracking component (208). The object detection component (206) may use any suitable technique for blob detection. Embodiments of a suitable object detection technique are described in U.S. patent application Ser. No. 12/966,798, filed Dec. 13, 2010. The object tracking component (208) includes functionality to track objects detected in the video sequence by the object detection component (206) using information regarding the detected objects provided by the object detection component (206). The object tracking component (208) may use any suitable technique for object tracking. Embodiments of a suitable object tracking technique are described in U.S. patent application Ser. No. 12/966,798, filed Dec. 13, 2010 and in U.S. patent application Ser. No. 12/910,494, filed Oct. 22, 2010.

In one or more embodiments of the invention, the object tracking component (208) and the object detection component (206) include functionality to determine if two or more of the objects being tracked should be merged into one object. More specifically, the two components perform a method for object localization based on tracked object trajectories as described herein in reference to FIGS. 4A-4B to determine if two or more objects detected by the object detection component (206) and tracked by the object tracking component (208) should be merged.

The video analysis component (204), depending on the specific application, may perform other processing using information produced by the objection detection component (206) and the object tracking component (208). For example, the video analysis component (204) may identify objects that meet predetermined criteria, may detect specific events or activities in the video sequence based in predetermined criteria, may identify areas of interest, etc.

The display (210) receives and displays data output by the video analysis component (204). This content of the output data may vary based on the particular application of the computer vision system (200). In some embodiments of the invention, the display (200) may also show the input video sequence. The connection between the video analysis component (204) and the display component (210) may be a direct or indirect connection or a network connection via, for example, a local area network (LAN), a wide area network (WAN) such as the Internet, a cellular network, any other similar type of network and/or any combination thereof) through a network interface (not shown).

The various components of the computer vision system (200) may be implemented in different digital systems. For example, in one or more embodiments of the invention, the video analysis component (204) and the video input component (202) may be embodied in a single digital system, e.g., the video analysis component (204) may be implemented as software and/or hardware in a video camera, and the display may be part of a separate digital system that receives the output of the single digital system. In another example, the video analysis component (204) may be installed on a server system and may receive and process video sequences from multiple video input components. Further, an application on another system may receive the outputs of the video analysis component (200) over a network. Further, the video analysis component (204) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3A:
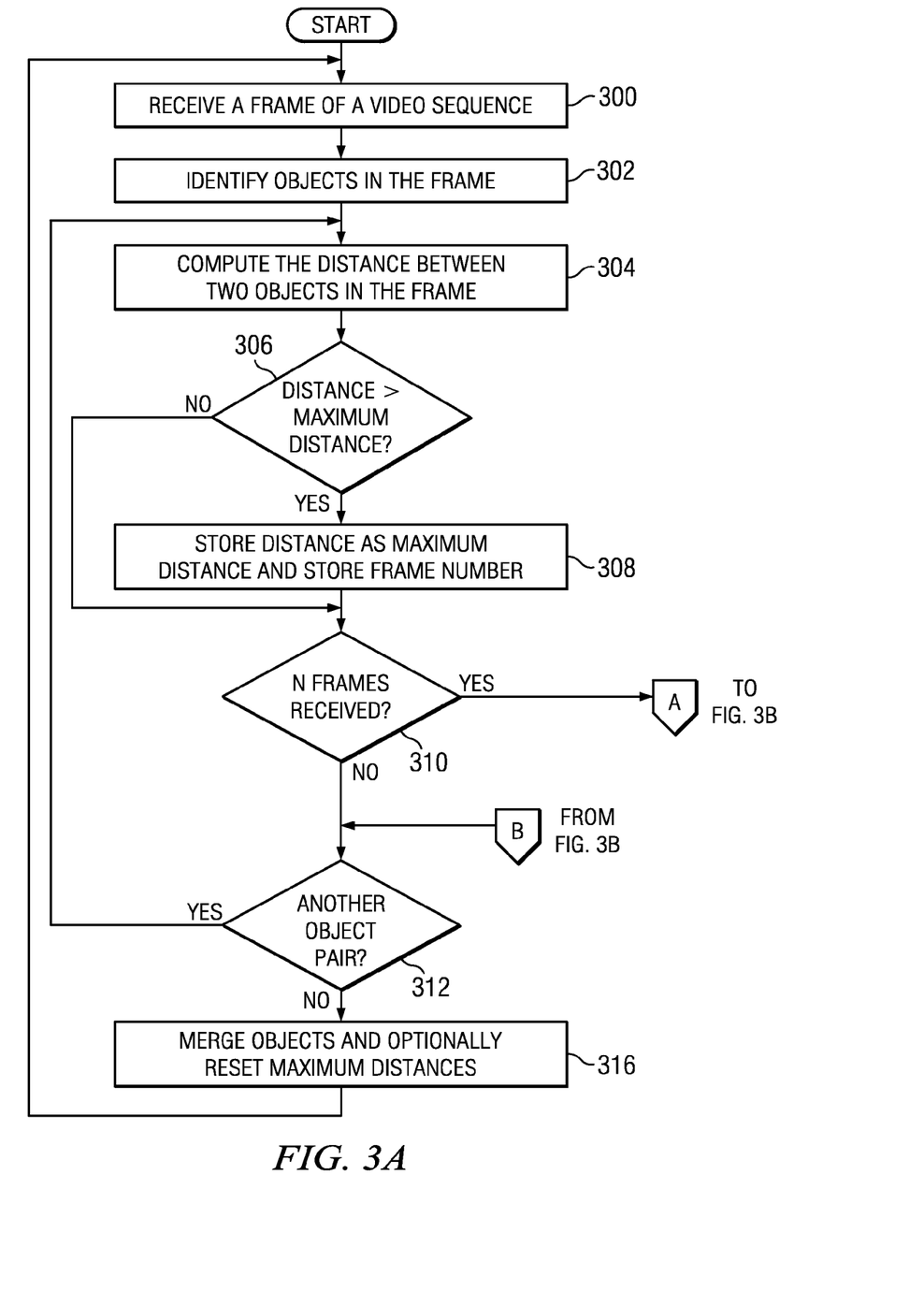
FIGS. 3A and 3B show a flow diagram of a method in accordance with one or more embodiments of the invention.
Figure 3B:
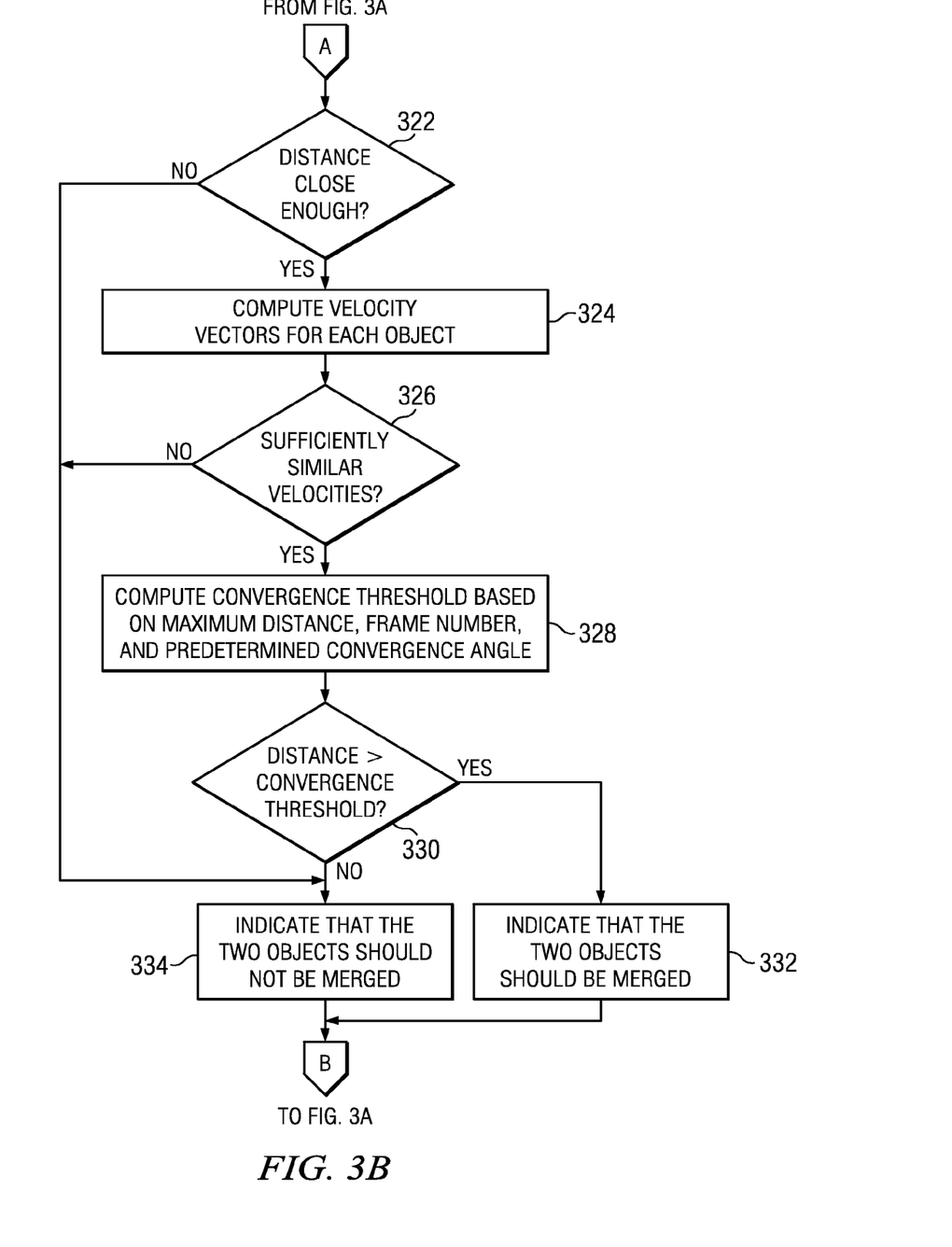

FIGS. 3A and 3B show a flow diagram of a method for object localization based on trajectories of tracked objects in accordance with one or more embodiments of the invention. In general, embodiments of the method track objects in a scene for N frames and, then determine whether any of the objects should be merged based on the similarity of the trajectories of those objects over the N frames. The number N specifies how many frames are to be processed before object merging decisions are made. The value of N may be a predetermined constant, based on the frame rate of the video sequence, a user-specified value, based on a user-specified tuning factor, or the like, or a combination thereof. Instead of being a global value, the value of N may be dependent on each pair of objects being evaluated for merging. For example, let G represent the age of an object, i.e., the number of frames for which an object has been tracked. Let the age of object A be denoted as $A_G$ and the age of object B be denoted as $B_G$. A technique to determine when to check if two object fragments, A and B, should be merged is as follows: if mod(min $(A_G, B_G), N) == 0$, then initiate the check for merging trajectories A and B.

For simplicity of explanation, the method assumes that all objects in a frame are processed, are present in the initial frame, and no new objects enter a video sequence until the method completes processing of the N frames. However, based on this description, one of ordinary skill in the art will understand other embodiments of the invention that do not use these assumptions. For example, heuristics such as the previously described technique based on the ages of objects could be applied to decide which detected objects are to be processed by the method and which are not, to group detected objects for separate application of the method on each group, etc.

As shown in FIG. 3A, initially, a frame of a video sequence is received (300) and objects are identified (detected) in the frame (302). Any suitable method for object detection may be used. Properties of the each detected object may include, for example, a unique label (identifier) for the object, the area of the object, the centroid of the object, the bounding box of the object, etc.

Then, the distance between two objects in the frame is computed (304). Any suitable technique for computing the distance may be used. For example, approximate distance measures such as the city-block distance measure may be used. In some embodiments of the invention, the distance is computed as the Euclidean distance between the centroids of the objects. If this distance is greater than a previously stored maximum distance between the two objects (306), then the computed distance is stored as the maximum distance and the frame number of the current frame is also stored (308). If N frames of the video sequence have not been received (310), then the processing continues with the next object pair in the frame, if any (312), or with the next frame in the video sequence (300). Thus, the maximum distance between every pair of objects is updated at each incoming frame. The frame number at which the latest maximum distance was detected is also stored for each pair of objects.

If N frames have been received (310), then as shown in FIG. 3B, a check is made to determine if the distance between the two objects is close enough for the two objects to be considered for possible merging (322). This check may be made by comparing the distance to a distance threshold. The value of distance threshold may be a predetermined constant, a user-specified value, based on a user-specified tuning factor, or the like, or a combination thereof. If the two objects are not close enough, an indicator is set indicating that the two objects should not be merged (334), and processing continues with the next object pair in the frame (312).

If the objects are close enough (322), then the velocity vectors for the two objects are computed (324). In general, the velocity of an object may be computed by differentiating the x and y components of its trajectory. Any suitable technique for computing the velocity vectors may be used. For example, the components of velocity may be computed as $Vx=x(t+1)-x(t)$, $Vy=y(t+1)-y(t)$, where Vx and Vy are components of velocity, t is the immediate past frame, and x and y are pixel coordinates of the tracked object, e.g., the coordinates of the centroid of the tracked object at t and t+1.

The velocities of the two objects are then compared to determine if they are sufficiently similar (326). This comparison may be done by computing the magnitude of each velocity vector and direction of the motion of the velocity vectors. The magnitude V of a velocity vector may be computed as $sqrt(Vx^2+Vy^2)$. The direction β may be computed a cos $((V_1x*V_2x+V_1y*V_2y)/V_1*V_2)$ where $V_1$ and $V_2$ are the magnitudes of the two velocity vectors and $V_1x$, $V_2x$ and $V_1y$, $V_1y$ are the x and y components of the two velocity vectors. The magnitudes and the direction may then be compared against thresholds to determine similarity. The value of each of the thresholds may be a predetermined constant, a user-specified value, based on a user-specified tuning factor, or the like, or a combination thereof. If the two velocities are not similar enough, an indicator is set indicating that the two objects should not be merged (334) and processing continues with the next object pair in the frame (312).

If the two velocities are similar enough, the trajectories of the two objects are compared. This comparison basically tests the angle of convergence of the trajectories of the two objects against an adaptive convergence threshold based on a maximum convergence angle. The size of the maximum convergence angle may be a predetermined constant, based on the frame rate of the video sequence, a user-specified value, based on a user-specified tuning factor, or the like, or a combination thereof.

First, the adaptive convergence threshold D is computed based on the maximum distance between the two objects during the N frames, the current frame number, and a maximum convergence angle (328). In some embodiments of the invention, the adaptive convergence threshold D is computed as $D=M-t*tan(\theta)$ where θ is the maximum angle of convergence, M is the maximum distance, t is the number of frames between the current frame and the frame at which the maximum distance, M, was recorded between the pair of objects. The adaptive threshold D is computed assuming a simple piece-wise linear model for object trajectories. The threshold D provides bounds on the required distance between two objects in the current frame in order to ensure that their (linear) trajectories do not converge at an angle greater than θ, given that two objects were M units apart t frames ago. Note that since θ is a pre-determined maximum angle of convergence, the value of tan(θ) can be pre-computed thus saving computation time.

Figure 4:
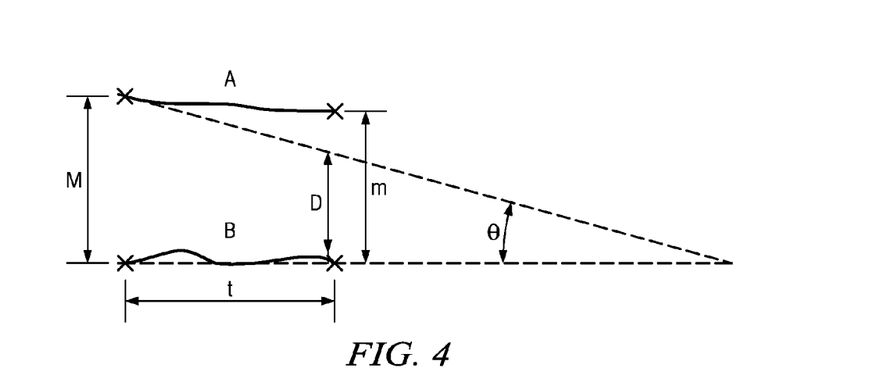
FIG. 4 illustrates object convergence in accordance with one or more embodiments of the invention.

The current distance between the two objects m is then compared to the adaptive convergence threshold D to determine how quickly the two trajectories are converging (330), i.e., how similar the two trajectories are. FIG. 4 illustrates this convergence test for two objects A and B tracked over a time t. If m>D, then the two objects are converging slowly enough, i.e., they are converging at an angle smaller than the maximum convergence angle θ, and can be merged. If m<D, then the two objects are converging at a faster than acceptable rate, i.e., at an angle larger than the maximum convergence angle θ, and should remain separate objects.

If the two objects are converging slowly enough, i.e., are sufficiently similar, an indicator is set to indicate that the two objects should be merged (332). Otherwise, an indicator is set to indicate that the two objects should not be merged (334) and processing continues with the next object pair in the frame (312). In some embodiments of the invention, an X×X adjacency matrix G (X is the number of objects) is used to store the indicators for each object pair. If two objects i and j are selected for merging, the value of the matrix location corresponding to those objects, G(i,j), is set to 1. Otherwise, the value is 0.

Referring back to FIG. 3A, once all objects pairs in the Nth frame have been processed, object pairs that have been marked as mergeable are merged into single objects (316). The maximum distances between the remaining objects may also reset to 0. Processing then resumes with the next frame in the video sequence (300). Resetting the maximum distances allows the system to "forget" that two objects may have been separate objects in the previous N frames. For example, consider a scene in which two objects are moving toward each other from opposite ends of the frame. At some point during the video sequence, the two objects begin moving together. When they are moving together, it may no longer matter that they were considered to be separate objects previously. That is, it may be desirable to track them as a single object to reduce resource requirements. If the maximum distance is reset periodically, at some point the system will forget that the two objects were far apart in the beginning. If the maximum distance is never reset, it will stay large and the objects will not ever be merged.

In some embodiments of the invention, when merging the mergable objects, a search may be performed to determine if more than two objects should be merged into a single object. For example, object A and B may be mergable and objects A and C may be mergable, which means that the three objects should be merged into a single object. In some embodiments of the invention, the mergable objects are treated as a graph and a depth first search is performed to determine if more than two objects should be merged into a single object.

In some embodiments of the invention, rather than testing the object trajectories for convergence, they are tested for divergence. In such embodiments, instead of storing the maximum distance between two objects over N frames, the minimum distance is stored. After N frames, an adaptive threshold is determined using the minimum distance, the frame number, and the angle θ. The same computation of the adaptive threshold D is used, where M is the minimum distance rather than the maximum distance. The distance between the two objects m at frame N is compared to the adaptive threshold D. If m>D, the objects are diverging at a faster rate than the angle θ and are not mergable. If m<D, then the objects are diverging at a slower rate than the angle θ and are mergable.

Embodiments of the invention provide for a simple, less computational complex method for improved object localization. Prior art object detection techniques employ computational and memory intensive processing such as processing a frame at multiple scales using an image pyramid and/or clustering algorithms to group similar features in an attempt to determine the true extent of detected objects. Further, some prior art techniques require storing trajectory information for each tracked object over a fixed time window. Then, at each time instance, all the points in a pair of object trajectories are compared to compute the average distance between the two objects. In contrast, embodiments of the invention use a lightweight technique for identifying similar trajectories. That is, the assumption is made that object trajectories can be approximated to be piece-wise linear. Based on this observation, the determination of whether two objects have been moving parallel to each other, i.e., are converging/diverging slower than an angle θ, can be based on comparing the distances between the two objects at two points in time. This approach does not require storing any trajectory information, as the maximum/minimum distance between a pair of objects can be updated on-the-fly at each frame. Further, the length of the time window over which parallelism is checked can be varied without affecting the memory or computational requirements of the method.

Embodiments of the methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

Embodiments of the methods described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the embodiments may be initially stored in a computer-readable medium and loaded and executed in the processor. In some cases, the software may also be sold in a computer program product, which includes the computer-readable medium and packaging materials for the computer-readable medium. Examples of computer-readable media include non-writable storage media such as read-only memory devices, writable storage media such as disks, memory, or a combination thereof.

Figure 5:
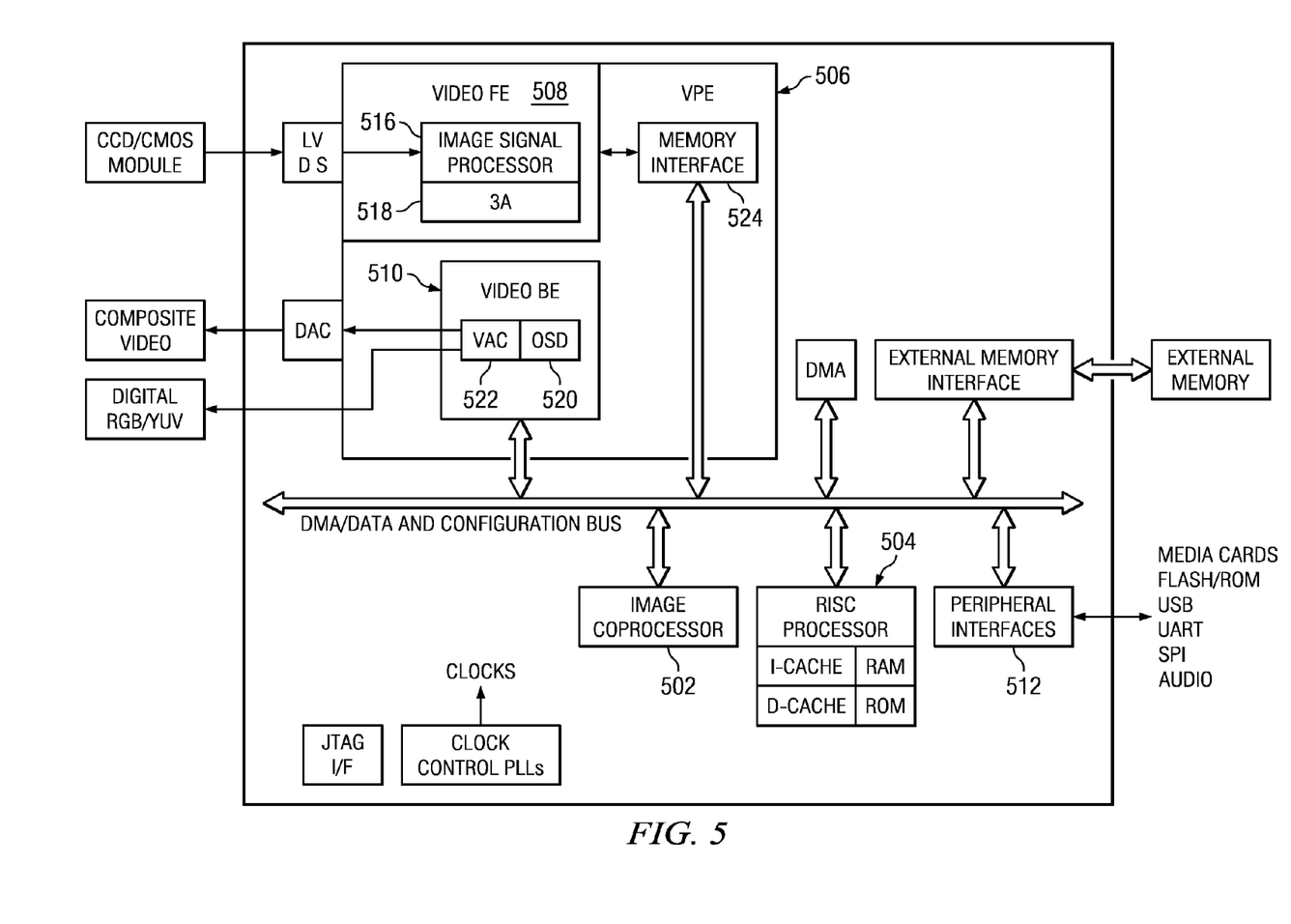
FIGS. 5-7 show illustrative digital systems in accordance with one or more embodiments of the invention.
Figure 6:
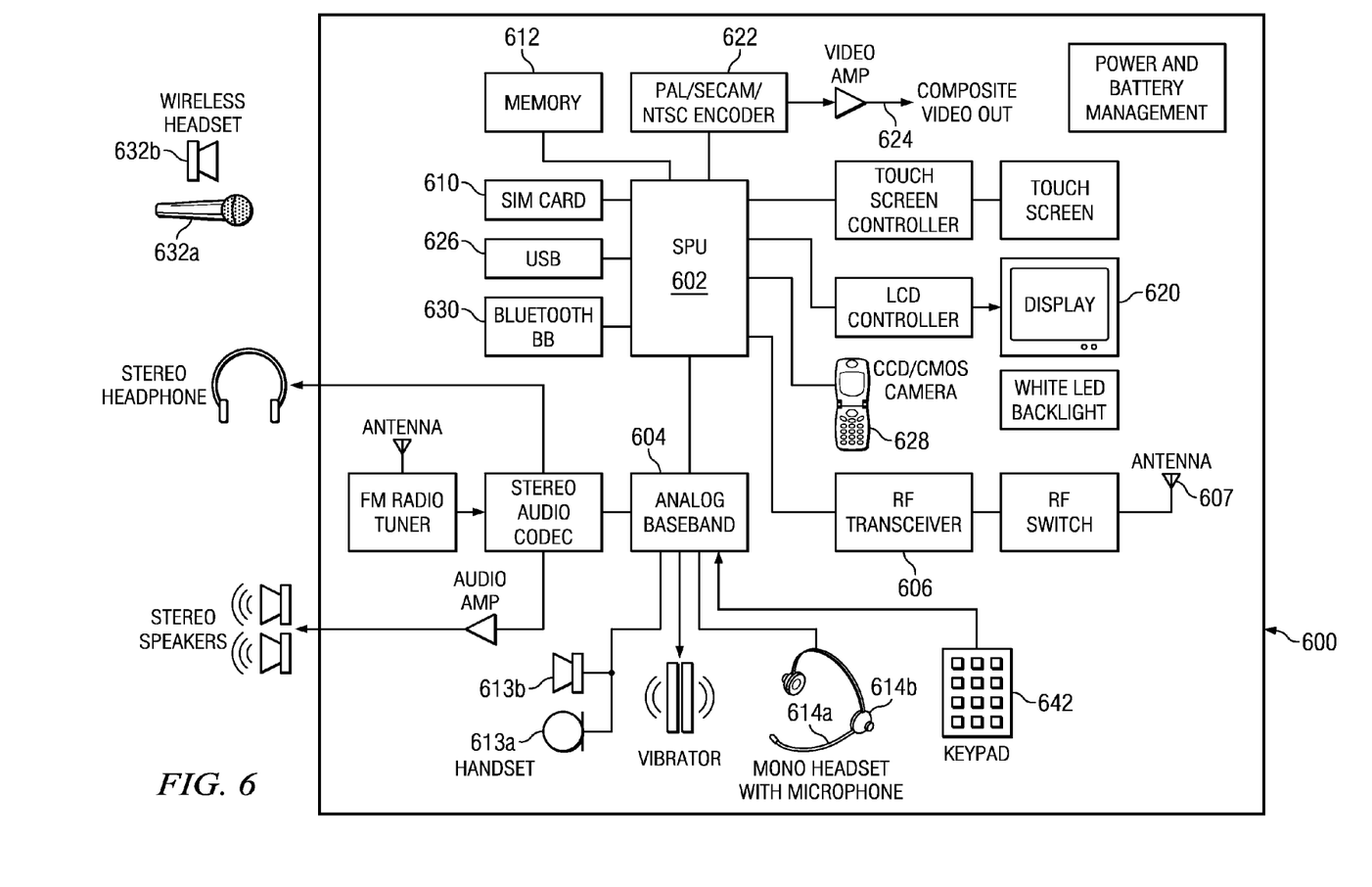
Figure 7:
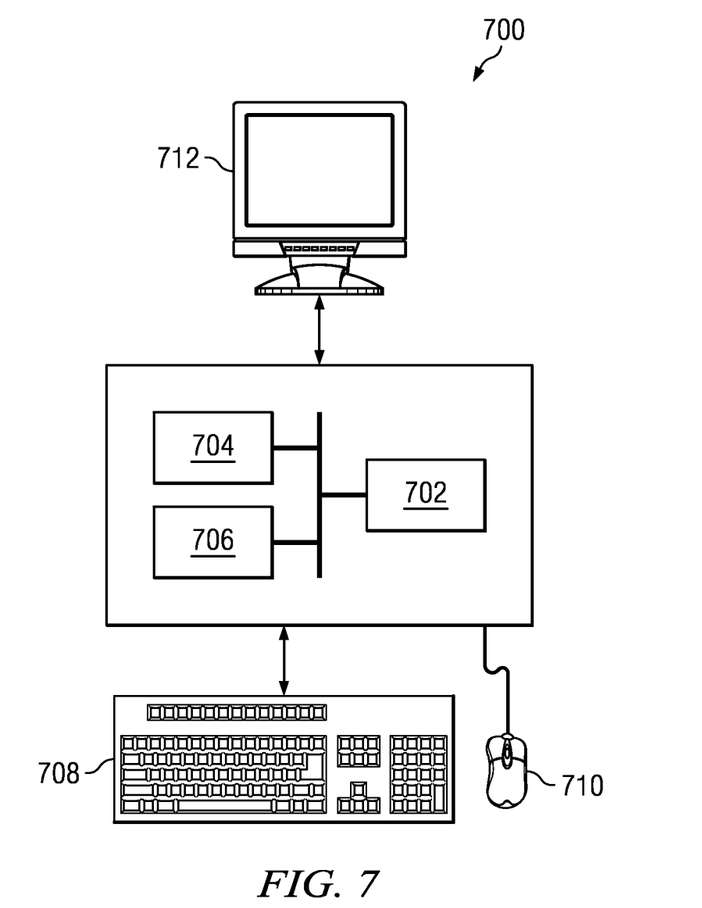

Embodiments of the methods and/or systems described herein may be implemented for virtually any type of digital system (e.g., a desk top computer, a laptop computer, a medical imaging system, a video surveillance system, a vehicle navigation system, a handheld device such as a mobile (i.e., cellular) phone, a personal digital assistant, a digital camera, etc.) with functionality to receive video input. FIGS. 5-7 show block diagrams of illustrative digital systems.

FIG. 5 shows a digital system suitable for an embedded system (e.g., a digital camera) in accordance with one or more embodiments of the invention that includes, among other components, a DSP-based image coprocessor (ICP) (502), a RISC processor (504), and a video processing engine (VPE) (506) that may be configured to perform one or more of the methods described herein. The RISC processor (504) may be any suitably configured RISC processor. The VPE (506) includes a configurable video processing front-end (Video FE) (508) input interface used for video capture from imaging peripherals such as image sensors, video decoders, etc., a configurable video processing back-end (Video BE) (510) output interface used for display devices such as SDTV displays, digital LCD panels, HDTV video encoders, etc, and memory interface (524) shared by the Video FE (508) and the Video BE (510). The digital system also includes peripheral interfaces (512) for various peripherals that may include a multi-media card, an audio serial port, a Universal Serial Bus (USB) controller, a serial port interface, etc.

The Video FE (508) includes an image signal processor (ISP) (516), and a 3A statistic generator (3A) (518). The ISP (516) provides an interface to image sensors and digital video sources. More specifically, the ISP (516) may accept raw image/video data from a sensor (CMOS or CCD) and can accept YUV video data in numerous formats. The ISP (516) also includes a parameterized image processing module with functionality to generate image data in a color format (e.g., RGB) from raw CCD/CMOS data. The ISP (516) is customizable for each sensor type and supports video frame rates for preview displays of captured digital images and for video recording modes. The ISP (516) also includes, among other functionality, an image resizer, statistics collection functionality, and a boundary signal calculator. The 3A module (518) includes functionality to support control loops for auto focus, auto white balance, and auto exposure by collecting metrics on the raw image data from the ISP (516) or external memory.

The Video BE (510) includes an on-screen display engine (OSD) (520) and a video analog encoder (VAC) (522). The OSD engine (520) includes functionality to manage display data in various formats for several different types of hardware display windows and it also handles gathering and blending of video data and display/bitmap data into a single display window before providing the data to the VAC (522) in YCbCr format. The VAC (522) includes functionality to take the display frame from the OSD engine (520) and format it into the desired output format and output signals required to interface to display devices. The VAC (522) may interface to composite NTSC/PAL video devices, S-Video devices, digital LCD devices, high-definition video encoders, DVI/HDMI devices, etc.

The memory interface (524) functions as the primary source and sink to modules in the Video FE (508) and the Video BE (510) that are requesting and/or transferring data to/from external memory. The memory interface (524) includes read and write buffers and arbitration logic.

The ICP (502) includes functionality to perform the computational operations required for compression and other processing of captured images. The video compression standards supported may include one or more of the JPEG standards, the MPEG standards, and the H.26x standards. In one or more embodiments of the invention, the ICP (502) is configured to perform the computational operations of methods as described herein.

In operation, to capture an image or video sequence, video signals are received by the video FE (508) and converted to the input format needed to perform video compression. Prior to the compression, a method(s) as described herein may be applied as part of processing the captured video data. The video data generated by the video FE (508) is stored in the external memory. The ICP can then read the video data and perform the necessary computations to detect and track objects in frames of the video data as described herein, merging the tracked objects in accordance with an embodiment of a method described herein. The video data is then processed based encoded, i.e., compressed. During the compression process, the video data is read from the external memory and the compression computations on this video data are performed by the ICP (502). The resulting compressed video data is stored in the external memory. The compressed video data may then read from the external memory, decoded, and post-processed by the video BE (510) to display the image/video sequence.

The RISC processor (504) may also includes functionality to perform the computational operations of methods as described herein. The RISC processor may read the video data stored in external memory by the video FE (508) and can perform the required computations and store the output back in external memory.

FIG. 6 is a block diagram of a digital system (e.g., a mobile cellular telephone) (600) that may be configured to perform methods as described herein. The signal processing unit (SPU) (602) includes a digital processing processor system (DSP) that includes embedded memory and security features. The analog baseband unit (604) receives a voice data stream from handset microphone (613*a*) and sends a voice data stream to the handset mono speaker (613*b*). The analog baseband unit (604) also receives a voice data stream from the microphone (614*a*) and sends a voice data stream to the mono headset (614*b*). The analog baseband unit (604) and the SPU (602) may be separate ICs. In many embodiments, the analog baseband unit (604) does not embed a programmable processor core, but performs processing based on configuration of audio paths, filters, gains, etc being setup by software running on the SPU (602). In some embodiments, the analog baseband processing is performed on the same processor and can send information to it for interaction with a user of the digital system (600) during a call processing or other processing.

The display (620) may also display pictures and video streams received from the network, from a local camera (628), or from other sources such as the USB (626) or the memory (612). The SPU (602) may also send a video stream to the display (620) that is received from various sources such as the cellular network via the RF transceiver (606) or the camera (626). The SPU (602) may also send a video stream to an external video display unit via the encoder (622) over a composite output terminal (624). The encoder unit (622) may provide encoding according to PAL/SECAM/NTSC video standards.

The SPU (602) includes functionality to perform the computational operations required for processing of digital images, video compression and decompression. The video compression standards supported may include, for example, one or more of the JPEG standards, the MPEG standards, and the H.26x standards. In one or more embodiments of the invention, the SPU (602) is configured to perform the computational operations of a method(s) as described herein. Software instructions implementing the method(s) may be stored in the memory (612) and executed by the SPU (602) during image processing of a picture or video stream.

FIG. 7 shows a digital system (700) (e.g., a personal computer) that includes a processor (702), associated memory (704), a storage device (706), and numerous other elements and functionalities typical of digital systems (not shown). In one or more embodiments of the invention, a digital system may include multiple processors and/or one or more of the processors may be digital signal processors. The digital system (700) may also include input means, such as a keyboard (708) and a mouse (710) (or other cursor control device), and output means, such as a monitor (712) (or other display device). Those skilled in the art will appreciate that these input and output means may take other forms.

The digital system (700) may also include a video capture device (not shown) that includes circuitry (e.g., optics, a sensor, readout electronics) for capturing video sequences. The digital system (700) may be connected to a network (714) (e.g., a local area network (LAN), a wide area network (WAN) such as the Internet, a cellular network, any other similar type of network and/or any combination thereof) via a network interface connection (not shown). The digital system (700) may receive video sequences and/or pictures via the network, via the video capture device, and/or via a removable storage medium (e.g., a floppy disk, optical disk, flash memory, USB key, a secure digital storage card, etc.) (not shown), and process the video sequence using image processing software that includes a method(s) as described herein.

Further, those skilled in the art will appreciate that one or more elements of the aforementioned digital system (700) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, or any other computer readable storage device. The software instructions may be distributed to the digital system (700) via removable memory (e.g., floppy disk, optical disk, flash memory, USB key), via a transmission path from a computer readable medium on another digital system, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method of processing a video sequence, the method comprising:
    tracking a first object and a second object for a specified number of frames, wherein tracking a first object and a second object comprises determining a maximum distance between the first object and the second object in the specified number of frames;
    determining similarity between a trajectory of the first object and a trajectory of the second object over the specified number of frames; and
    merging the first object and the second object into a single object when the trajectory of the first object and the trajectory of the second object are sufficiently similar, whereby an accurate location and size for the single object is obtained.

2. The method of claim 1, wherein
determining similarity comprises:
    computing an adaptive convergence threshold based on a maximum convergence angle, the maximum distance, and a number of frames between a frame where the maximum distance was determined and a current frame; and
    indicating that the trajectory of the first object and the trajectory of the second object are sufficiently similar when a distance between the first object and the second object in the current frame is larger than the adaptive convergence threshold.

3. The method of claim 2, wherein computing an adaptive convergence threshold further comprises computing the adaptive convergence threshold as M-t*tan(θ), wherein θ is the maximum convergence angle, M is the maximum distance, and t is the number of frames.

4. The method of claim 1, further comprising:
    performing determining similarity only when the first object and the second object are close enough to be considered for possible merging.

5. The method of claim 4, wherein a distance between the first object and the second object in a current frame is compared to a distance threshold to determine if the first object and the second object are close enough.

6. The method of claim 1, further comprising:
    computing a first velocity of the first object and a second velocity of the second object; and
    performing determining similarity only when the first velocity and the second velocity are sufficiently similar.

7. The method of claim 6, wherein a magnitude and a direction of the first velocity and a magnitude and a direction of the second velocity are compared to determine if the first velocity and the second velocity are sufficiently similar.

8. The method of claim 1, wherein
    tracking a first object and a second object for a specified number of frames comprises determining a minimum distance between the first object and the second object in the specified number of frames; and
    determining similarity comprises:
        computing an adaptive divergence threshold based on a maximum divergence angle, the minimum distance, and a number of frames between a frame where the minimum distance was determined and a current frame; and
        indicating that the trajectory of the first object and the trajectory of the second object are sufficiently similar when a distance between the first object and the second object in the current frame is smaller than the adaptive divergence threshold.

9. The method of claim 8, wherein computing an adaptive divergence threshold further comprises computing the adaptive divergence threshold as M-t*tan(θ), wherein θ is the maximum divergence angle, M is the minimum distance, and t is the number of frames.

10. A digital system comprising:
    a video input component configured to provide a video sequence; and
    an object detection component configured to detect a first object and a second object; and
    an object tracking component configured to
        track a first object and a second object for a specified number of frames; and
        determine similarity between a trajectory of the first object and a trajectory of the second object over the specified number of frames by computing an adaptive convergence threshold based on a maximum convergence angle, the maximum distance, and a number of frames between a frame where the maximum distance was determined and a current frame, and indicating that the trajectory of the first object and the trajectory of the second object are sufficiently similar when a distance between the first object and the second object in the current frame is larger than the adaptive convergence threshold,
    wherein the first object and the second object are merged into a single object when the trajectory of the first object and the trajectory of the second object are sufficiently similar,
    whereby an accurate location and size for the single object is obtained.

11. The digital system of claim 10, wherein the object tracking component is configured to:
    determine a maximum distance between the first object and the second object in the specified number of frames.

12. The digital system of claim 11, wherein computing an adaptive convergence threshold further comprises computing the adaptive convergence threshold as M-t*tan(θ0), wherein θ is the maximum convergence angle, M is the maximum distance, and t is the number of frames.

13. The digital system of claim 10, wherein the object tracking component is further configured to determine similarity only when the first object and the second object are close enough to be considered for possible merging.

14. The digital system of claim 13, wherein the object tracking component is further configured to compare a distance between the first object and the second object in a current frame to a distance threshold to determine if the first object and the second object are close enough.

15. The digital system of claim 10, wherein the object tracking component is further configured to:
    compute a first velocity of the first object and a second velocity of the second object; and determine similarity only when the first velocity and the second velocity are sufficiently similar.

16. The digital system of claim 15, wherein the object tracking component is further configured to compare a magnitude and a direction of the first velocity and a magnitude and a direction of the second velocity to determine if the first velocity and the second velocity are sufficiently similar.

17. The digital system of claim 10, wherein the object tracking component is configured to:
   determine a minimum distance between the first object and the second object in the specified number of frames; and
   determine similarity by:
      computing an adaptive divergence threshold based on a maximum divergence angle, the minimum distance, and a number of frames between a frame where the minimum distance was determined and a current frame; and
      indicating that the trajectory of the first object and the trajectory of the second object are sufficiently similar when a distance between the first object and the second object in the current frame is smaller than the adaptive divergence threshold.

18. The digital system of claim 17, wherein computing an adaptive divergence threshold further comprises computing the adaptive divergence threshold as $M-t*\tan(\theta)$, wherein $\theta$ is the maximum divergence angle, M is the minimum distance, and t is the number of frames.

19. A computer readable medium storing software instructions executable by a processor to perform a method of processing a video sequence, the method comprising:
   tracking a first object and a second object for a specified number of frames;
   determining similarity between a trajectory of the first object and a trajectory of the second object over the specified number of frames, wherein determining similarity comprises computing an adaptive convergence threshold based on a maximum convergence angle, the maximum distance, and a number of frames between a frame where the maximum distance was determined and a current frame or an adaptive divergence threshold based on a minimum divergence angle, the minimum distance, and a number of frames between a frame where the minimum distance was determined and the current frame, and indicating that the trajectory of the first object and the trajectory of the second object are sufficiently similar when a distance between the first object and the second object in the current frame is larger than the adaptive convergence threshold or when the distance is smaller than the adaptive divergence threshold; and
   merging the first object and the second object into a single object when the trajectory of the first object and the trajectory of the second object are sufficiently similar, whereby an accurate location and size for the single object is obtained.

20. The computer readable medium of claim 19, wherein tracking a first object and a second object comprises determining a maximum distance or a minimum distance between the first object and the second object in the specified number of frames.

\* \* \* \* \*